United States Patent [19]
Joyce et al.

[11] Patent Number: 5,148,530
[45] Date of Patent: Sep. 15, 1992

[54] METHOD FOR REEXECUTING INSTRUCTION BY ALTERING HIGH BITS OF INSTRUCTION ADDRESS BASED UPON RESULT OF A SUBTRACTION OPERATION WITH STORED LOW BITS

[75] Inventors: Thomas F. Joyce, Westford, Mass.; Richard P. Kelly, Nashua, N.H.; Jian-Kuo Shen, Belmont, Mass.

[73] Assignee: Bull HN Information Systems Inc., Billerica, Mass.

[21] Appl. No.: 403,554

[22] Filed: Sep. 6, 1989

Related U.S. Application Data

[62] Division of Ser. No. 52108, May 19, 1987, Pat. No. 4,901,222.

[51] Int. Cl.[5] .......................... G06F 9/00; G06F 9/32
[52] U.S. Cl. ............................... 395/375; 395/800; 364/262.4; 364/262.9; 364/262.3; 364/266.5; 364/946.2; 364/770; 364/DIG. 1
[58] Field of Search .................. 395/800, 375; 371/12

[56] References Cited

U.S. PATENT DOCUMENTS

| | | | |
|---|---|---|---|
| 4,041,474 | 8/1977 | Le Can | 340/173 |
| 4,224,676 | 9/1980 | Appelt | 364/712 |
| 4,524,415 | 6/1985 | Mills, Jr. et al. | 364/200 |
| 4,670,835 | 5/1987 | Kelly et al. | 364/200 |
| 4,707,799 | 11/1987 | Ishikawa et al. | 364/771 |
| 4,805,095 | 2/1989 | Armstrong et al. | 364/200 |

*Primary Examiner*—Thomas C. Lee
*Assistant Examiner*—Caleb Pollack
*Attorney, Agent, or Firm*—George Grayson; Lewis P. Elbinger; John S. Solakian

[57] ABSTRACT

In a data processing system using a virtual memory adressing scheme, certain software instructions call for the virtual address to be stored in a base register. The virtual address stored in the base register is incremented or decremented during the read out cycle of the previous operand to address the next operand. If the operand is not in physical memory, then the contents of the base register is restored to its original value.

3 Claims, 5 Drawing Sheets

FIG. 1 UNDO LOGIC

FIG. 2

LDR

| 0 | 1 3 | 4 7 | 8 | 9 11 | 12 | 13 15 |
|---|---|---|---|---|---|---|
| 1 | R Reg # 1-7 | 8_H | 0 | 7_H | 0 | B_n 1-7 |

FIG. 3

UNDO STACK

| 0 3 | 4 5 | 6 7 |
|---|---|---|
| RFA | I/O | RA |

| FIRMWARE STEPS | REGISTER FILE 2 REGISTER | CONTENTS OF REGISTERS |
|---|---|---|
| A09 | AW5 | 0 3 4 5 7 8 ... 31 / RFA \| I/D \| RA \| 0 ———— 0 |
| A02 | AW5 | 0 ———— 0 \| RFA \| I/D \| RA   (24 27 29 31) |
| A03 | AW4 | 0 ———— 0 \| RA |
| A78 | AW3 | 0 ———— 0 \| Bnx   (29 31) |
| A79 | Bn | Bn \| 000   (0 ... 28 31) |
| A7A | AW2 | 0 ———— 0 \| $8_H$   (27 28 31) |

FIG. 5

METHOD FOR REEXECUTING INSTRUCTION BY ALTERING HIGH BITS OF INSTRUCTION ADDRESS BASED UPON RESULT OF A SUBTRACTION OPERATION WITH STORED LOW BITS

This application is a division of application Ser. No. 07/052,108, filed May 19, 1987, now U.S. Pat. No. 4,901,222.

BACKGROUND OF THE INVENTION

1. Field of the Invention

This invention relates to the data processing field and more particularly to a means for undoing a partially executed software instruction to restore the central processing unit to the state it was in before the start of instruction execution.

2. Description of the Prior Art

In a data processing system using a virtual memory addressing scheme, conditions may arise during the execution of a software instruction in which an operand addressed by the software instruction is not present in physical memory and therefore must be read into physical memory by a software routine. In order to be able to execute the software routine, the execution of the current software instruction must be suspended in a manner which permits it to be restarted once the missing operand is brought into physical memory.

In order to improve the system throughput, the virtual memory address is incremented or decremented immediately after being transferred to virtual memory so that it is available during the next memory cycle. If the operand is not found, then the previous virtual memory address must be recomposed and used when the missing operand is found and stored in physical memory. This would require another register, one storing the original virtual address and the other storing the incremented or decremented virtual address. This would assure an improved throughput at the cost of a large register typically 24 or 32 bits.

Of course one may wait until the operand is read out of physical memory before incrementing or decrementing the virtual address. This approach would also have a detrimental impact on system performance.

Another approach is to perform the UNDO operation exclusively by firmware. This will also have a negative impact on performance.

SUMMARY OF THE INVENTION

In a data processing system using a virtual memory addressing scheme, certain software instructions call for the virtual address to be stored in a base register The virtual address stored in the base register is incremented or decremented during the read out cycle of the previous operand to address the next operand. If the operand is not in physical memory, then the contents of the base register is restored back to its original value.

This is accomplished by storing in a PUSH-POP stack, the low order three bits of the 32 bit virtual address from the base register, an address of the base register which is typically stored in a register file, and a bit indicating whether the contents of the base register was incremented or decremented. Since software instructions may include up to three descriptors, the stack on a first-in-first-out basis can accomodate them in three locations.

If the virtual address does not find the operand, then the contents of the base register must be incremented in the execution of the software instruction which required virtual addresses to be decremented, or must be decremented if the execution of the software address required the virtual address to be incremented.

In most cases all that is required is to transfer the three virtual address bits to the base register. However, where there was a carry into, or borrow from, the fourth low order bit position, and where the virtual address was incremented, a binary ONE must be subtracted from the virtual address of which the fourth low order bit is now the low order bit of the remaining virtual address. Assuming the virtual address bits 0 through 31, the low order bits 29, 30 and 31 are stored in the PUSH-POP stack and must be stored back in the base register. The binary ONE is subtracted from the portion of the virtual address specified by bits 0 through 28.

Similarly if the virtual address were decremented and there was a borrow out of the bit 28 position of the virtual address, then binary ONE is added to the portion of the virtual address specified by bits 0 through 28.

The determination of whether or not there was a carry or a borrow from bit 28 is to subtract the original three lower order bits of the virtual address from the incremented or decremented value of the low order three bits. If a carry results then the bits 0 through 28 of the contents of the base register require adjustment for the increment operation. If a carry does not result, then bits 0 through 28 of the contents of the base register do not require adjustment to the decrement operation.

Accordingly, it is one of the objects of this invention to provide an improved apparatus and method for backing out of a software instruction after execution has begun using a minimum of logic.

BRIEF DESCRIPTION OF THE DRAWINGS

FIG. 2 shows the format of a typical virtual address software instruction.

FIG. 3 shows the contents of a location in the PUSH-POP stack.

FIG. 5 shows the contents of the various registers of the register file.

DESCRIPTION OF THE PREFERRED EMBODIMENT

Figure 1:
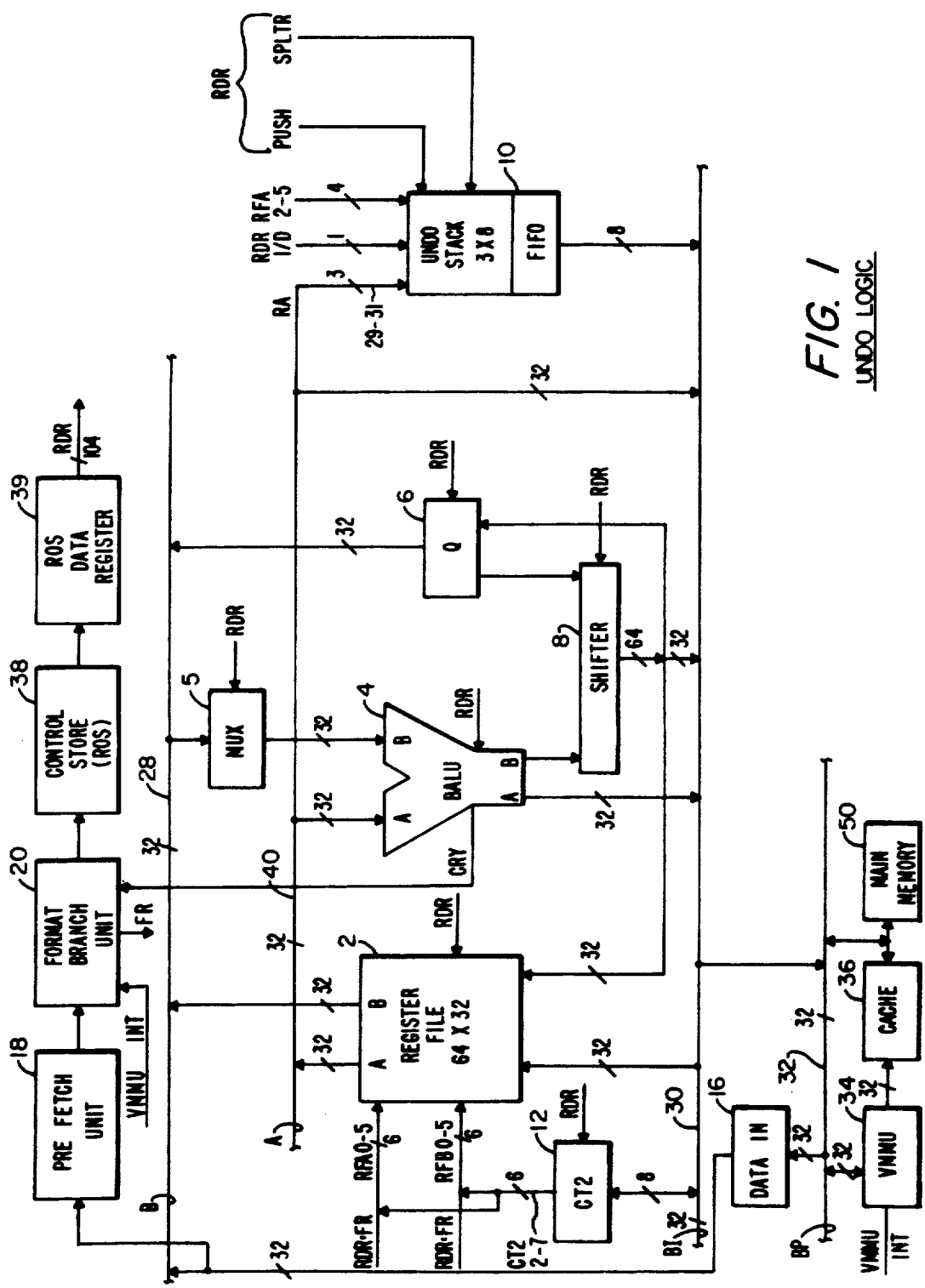
FIG. 1 shows a block diagram of the logic which accomplishes the UNDO operation.

FIG. 1 shows a block diagram of a portion of a data processing system which executes the UNDO portion of selected instructions, basic operating system instructions, commercial instructions and scientific instructions.

A virtual memory management unit (VMMU) 34, a cache memory 36 and the main memory 50 are all coupled to a 32 bit BP bus 32.

The VMMU 34 translates a virtual address described in the instruction being executed into a physical address of main memory 50. The virtual address includes a ring number, a segment number and a displacement This locates a process stored in the VMMU 34 and enables the VMMU 34 to send the physical address out on BP bus 32 to main memory 50 and directly from VMMU 34 to cache 36. If the location specified by the physical address does not store the operand, then a VMMU interrupt signal indicating a page or segment fault is applied to a format branch unit 20. The VMMU 34 and cache 36 operations are conventional for the purpose of understanding the invention.

A register file 2 includes sixty four 32 bit registers. A number of program visible registers of register file 2 can be loaded and read by various instructions.

These include seven software visible general word operand registers, R1 through R7 which are 16 bits in length and may operate as general registers, accumulators or index registers; seven software visible 32 bit double word operand registers K1 through K7 which are used as general registers, accumulators or index registers; and seven software visible base registers B1 through B7 which store information for formulating addresses pointing to any instruction, data or arbitrary location in the virtual memory of a process. Also included are a number of other registers.

Register file 2 receives operands from a 32 bit BI bus 30 at an Ai input port and from a shifter 8 at a Bi input port. Operands read from locations in register file 2 are transferred to a 32 bit A bus 40 from an Ao output port and to a 32 bit B bus 28 from a Bo output port. Each location in register file 2 may be addressed by Ai address signals or Bi address signals. The Ao output port is active during a read operation when a location in register file 2 is addressed by the Ai address signals. Similarly the B output ports are active when the location is addressed by the Bi address signals.

A binary arithmetic logic unit (BALU) 4 receives 32 bit operands from A bus 40 and B bus 28 at an A" operand input port and at a B" operand input port respectively. The BALU 4 applies a 32 bit A' operand to the BI bus 30 and a 32 bit B' operand to shifter 8. The BALU 4 performs binary arithmetic and logic operations on the A" and B" operands as specified by miscellaneous RDR signals.

A prefetch unit 18 receives the next instruction from the VMMU 34 or the cache 36 over the BP bus 32 and the DATA IN unit 16. The instruction is assembled and then transferred to the format branch unit 20. There the OP code is decoded and a number of OP code signals FR generated.

A control store (ROS) 38 receives address signals from the format branch unit 20 to read out the contents of ROS 38 locations to allow the system to execute the instruction. The contents of each location is stored in turn in a 104 bit ROS data register 39. Combinations of the 104 output signals identified as RDR signals perform the UNDO operation.

For this invention, the base address in registers B1 through B7 or the index value stored in registers R1 through R7 will be applied to the A" operand input port of BALU 4 from Ao output port of the register file 2 via A bus 40. The BALU 4 increments or decrements the base address or the index value and stores the incremented or decremented address or index value back in the same register in register file 2 from which it was read via the A' operand port of BALU 4 and BI bus 30.

The Q register 6 and the shifter 8 operate in conjunction with the BALU 4 to perform various arithmetic and logic operations including binary multiplication and division under RDR signal control.

A PUSH POP UNDO stack 10 has 3 locations of 8 bits each and first-in-first-out (FIFO) logic pointers which cause the 3 locations to be read out in the same order in which they were written into stack 10. As shown in FIG. 3, the eight bits in each location include the low order 3 bits of the contents of a respective register read from register file 2, one bit indicating if the BALU 4 incremented or decremented the contents of that register, and four bits identifying the register.

If the instruction being executed is a two word or a three word instruction, the two locations or three locations respectively, of stack 10, store the appropriate information. This is particularly important when executing commercial instructions in which a first descriptor locates a first operand, a second descriptor locates a second operand and a third descriptor gives the location in which the result of the operation performed on the first and second descriptors is stored.

The SPLTR signal which represents a number of decoded control bit signals resets the stack 10.

The Q register 6 stores a constant, hexadecimal 7 which is shifted right one bit position when processing each word read from stack 10.

If during the execution of an instruction, the format branch unit 20 receives the interrupt signal from the VMMU 34, indicating that the requested operand is not in the segment or page, then instruction execution is aborted and the UNDO operation initiated.

DESCRIPTION OF OPERATION

The system of FIG. 1 utilizes the load register instruction (LDR) of FIG. 2. The instruction stores the contents of the effective address of main memory 50, specified by the address syllable bits 9 through 15, in a general word operand R register specified by bits 1 through 3. Bit 0 at binary ONE specifies that the instruction contains an address syllable (AS). Bits 1 through 3 not at binary ZERO specifies a double operand instruction. Bits 4 through 7 specify the high order OP code number as hexadecimal 8. Bit 8 specifies the low order of the OP code number as binary 0.

Bits 9 through 11 of the address syllable at octal 7 indicates that bits 13 through 15 specify the single base register B1 through B7 that store the main memory address of the operand location Address signals RFA0 through RFA5 are applied to the register file 2 to read the contents of that location Signals RFA0, RFA1 and RFA2 are selected RDR signals and signals RFA3 through RFA5 are the equivalent of the LDR instruction bits 13 through 15 (FR signals). The contents of the addressed B register appear on the A bus 40 and are applied to the A" operand port of BALU 4. In the BALU 4 the address is incremented by ONE and stored back into register file 2 at the same location specified by signals RFA0 through RFA5. If at this time the PUSH signal is activated, then the low order three bits, 29, 30 and 31 of the contents of the addressed B register, the low order four bits of A address signals RFA2 through RFA5, and a bit indicating that the contents of the B register was incremented are stored in stack 10. Also during this cycle the contents of the addressed B register is applied to the VMMU 34 to generate the main memory 50 address. If that addressed location is not in a segment of a page of memory 50 or cache 36, then the execution of the load register instruction is interrupted by a VMMU interrupt signal applied to the format branch unit 20 and the contents of the addressed register is decremented to its original value.

The stack 10 stores the low order 3 bits, bits 29 through 31 (RA) as read from the addressed B registers 1 through 7. The contents of the addressed B register was incremented by binary ONE. Now assuming that the execution of the LDR instruction was interrupted, then a POP operation is required. The contents of the addressed B register must be decremented to the original value. In most cases transferring bits 5 through 7 (RA) from stack 10 and storing them in bit positions 29 through 31 of the addressed B register accomplishes this. However, in case there was a carry into bit position 28 of the addressed B register during the increment operation, then the portion of the address represented by bits 0 through 28 must be decremented.

The LDR instruction results in the addressed B register being incremented. The operation of some instructions calls for the contents of the addressed B register to be decremented. Therefore the UNDO operation would increment the contents of the addressed B register to restore it to its previous value.

Figure 4:
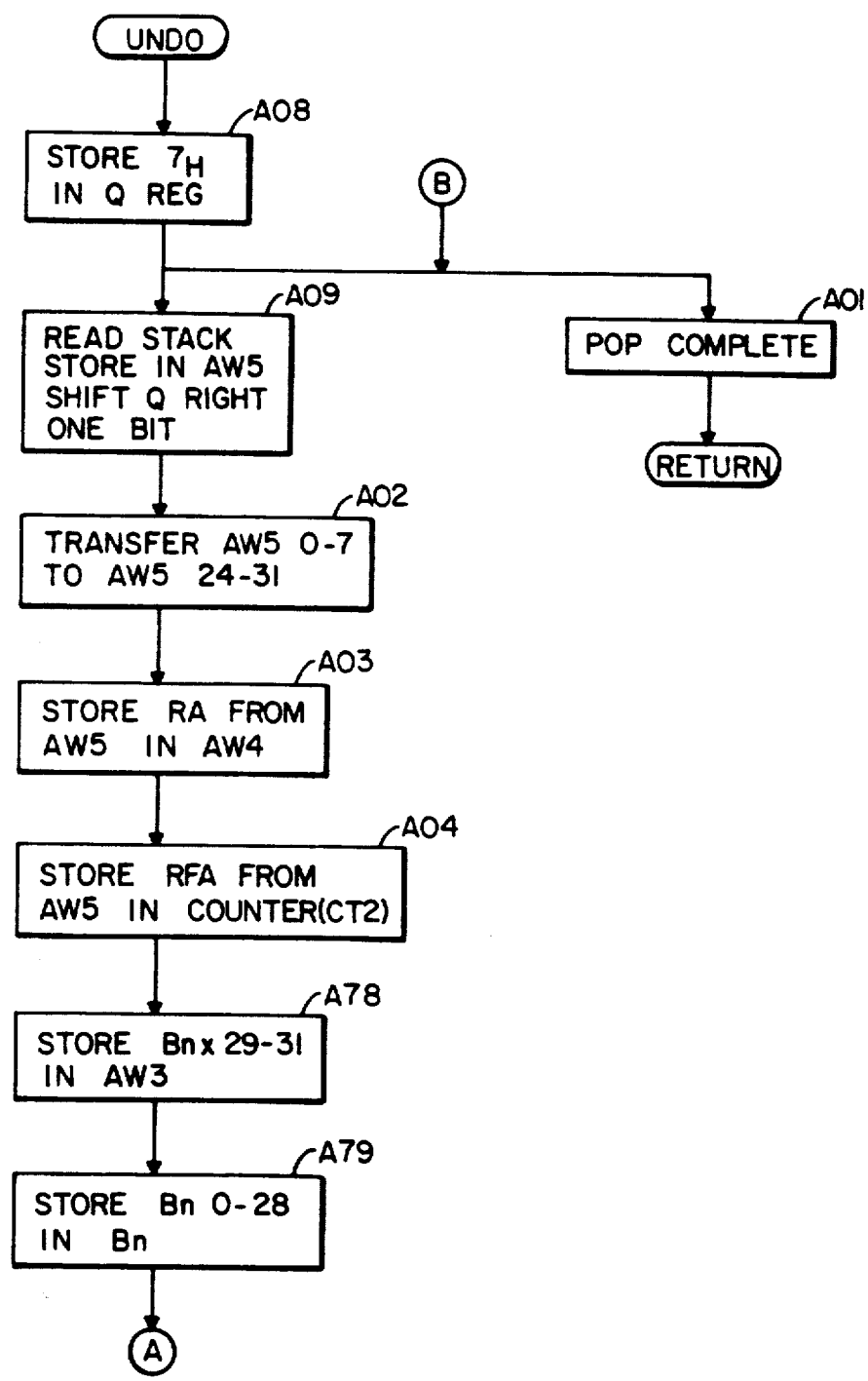
FIG. 4 is a firmware block diagram of the steps of implementing the UNDO operation.
Figure 4:
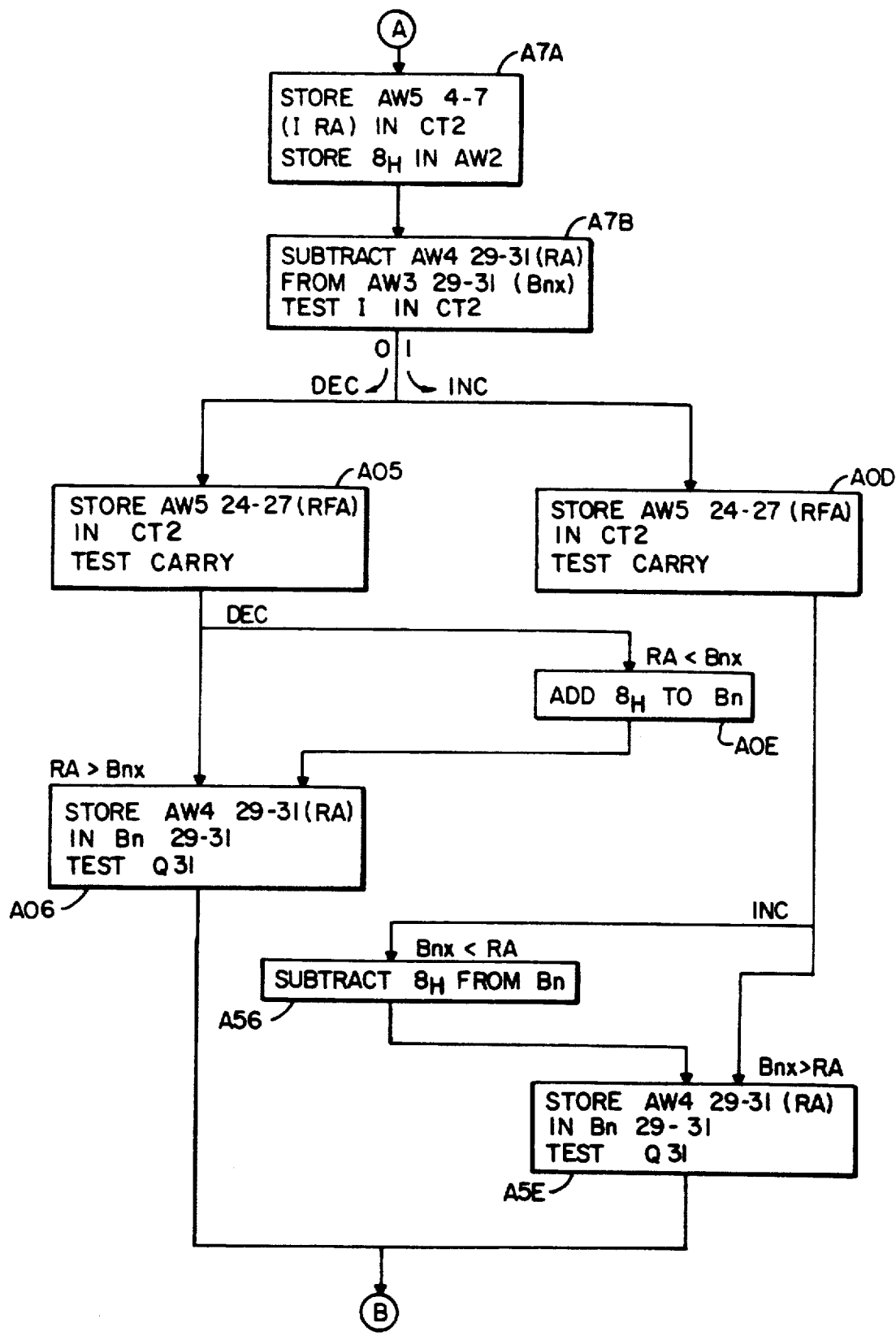

The incrementing or decrementing of the addressed B register in register file 2 is accomplished by the firmware described in conjunction with the flow diagram of FIG. 4. FIG. 5 shows the contents of the various working registers.

Block A08 stores a constant, hexadecimal 7 in the Q register 6 forcing bits Q29, Q30 and Q31 to binary ONE. The constant hexadecimal 7 is loaded into Q register 6 via B bus 28, BALU 4 and shifter 8.

Three locations of stack 10 are always read out. After each readout, the contents of Q register 6 is shifted right one position and the low order bit, Q31 tested for binary ZERO to indicate that three locations of stack 10 were read Block A09 stores the contents of the first stack 10 location in a working register AW5 in register file 2 in bit positions 0–7 at a location specified by address signals RFA 0–5. This is shown in FIG. 5. Also the contents of Q register 6 is shifted right, one bit position by shifter 8.

Block A02 reads the contents of working register AW5 onto the B bus, through a multiplexer (MUX). 5, BALU 4, shifter 8 and stored back in working register AW5. AW5 shifted bits 0 through 7 into bit positions 24 through 31 of working register AW5 as shown in FIG. 5. In this block working register AW5 was addressed by address signals RFB 0–5 to enable the B port of register file 2. Address signals RFB 0–5 were generated by selected FR and RDR signals.

Block A03 loads a working register AW4 with the RA field. This is accomplished by a logical AND operation of the contents of working register AW5 applied to the A" operand port of BALU 4 and a hexadecimal 7 constant applied to the B" operand port of BALU 4. The result is stored in working register AW4 in register file 2.

Block A04 stores the RFA field of the stack 10 location in the CT2 counter 12 by reading the contents of working register AW5 out of the B port of register file 2, into the B" operand port of BALU 4, shifting the result 4 bit positions right in the shifter 8 and storing the shifted result, RFA into counter 12.

Block A78 performs a logical AND operation on the contents of the addressed B register and hexadecimal 7 and stores the result in working register AW3 in register file 2. The B register is addressed by the contents of the CT2 counter 12 which stores the RFA address Working register AW3 store $B_nX$ bits 29, 30 and 31, the low order bits of the incremented contents of the addressed B register. The RFA address in counter 12 reads out the contents of the B register into the A" operand port of BALU 4. Hexadecimal 7 is applied to the B" operand port from the B bus 28 and the 3 bit logical AND result is stored in working register AW3.

Block A79 performs a logical AND operation on the contents of the B register addressed by the contents of the counter 12 (RFA) and hexadecimal FFFFFFF8. The result, bits 0 through 28 are stored back in the B register. Bits 29, 30 and 31 are at logical ZERO.

Block A7A stores a hexadecimal 8 in working register AW2 and stores the I and RA fields, bits 28 through 31, from working register AW5 into counter 12.

Block A7B subtracts the contents of working register AW3 ($B_nX$) from the contents of working register AW4 (RA). Address signals RFA 0–5 addresses location AW3 and the contents applied to the A" operand port of BALU 4. On the same cycle, address signals RFB 0–5 addresses location AW4 and the contents applied to the B" operand port of BALU 4. If $B_nX$ is larger than RA, and this is an increment operation as indicated by bit 4 in counter 12 at logical ONE, then no carry would result.

In block A0D the contents of working register AW5, shifted four bits right is stored in counter 12 and the BALU 4 carry signal applied to the format branch unit 20. Since $B_nX$ is larger than RA, then in block A5E the contents of the B register is OR'd with the contents of working register AW4 and the result stored in the B register which is addressed by the contents of counter 12, RFA.

If in the increment operation, RA were larger than $B_nX$, this would indicate that there was a carry into the bit 28 position of the addressed B register. Then in block A56 the contents of working register AW2, a hexadecimal 8 is subtracted from the contents of the addressed B register bits 0–28 in BALU 4, and the result is stored back in the addressed B register. (Note that this subtracts binary ONE from bit position 28.)

Then in block A5E, the contents of working register AW4, RA is OR'd with the contents of the addressed B register in BALU 4 and the result, the original memory address, is stored back in the addressed B register.

If in block A7B the "4 bit" in counter 12 indicates a decrement operation, then there would be a carry if $B_nX$ were greater than RA. Therefore, in block A02, the contents of working register AW2 is added to the contents of the addressed register. (Adding binary ONE to bit position 28)

And in block A06 the contents of register AW4, RA is OR'd with the contents of the addressed B register and the result, the original memory address, is stored back in the addressed B register.

Both blocks A06 and A5E test the Q31 bit of the Q register 6. If that bit is a binary ZERO indicating that this is the third entry in stack 10, then block A01 concludes the UNDO operation and the firmware returns to the background mode. Otherwise if Q31 were at binary ONE then the firmware branches to block A09 to continue the UNDO operation.

Note that if this were a three descriptor instruction and both the first and second operands were received from memory, but that the resulting third operand location was not in memory, the instruction would still be aborted and the three base registers storing the locations of the three operands restored to their original states.

While the invention has been shown and described with reference to the preferred embodiment thereof, it will be understood by those skilled in the art that the above and other changes in form and detail may be made therein without departing from the spirit and scope of the invention.

What is claimed is:

1. A method of initializing an instruction in a data processing system if execution of the instruction is interrupted following modification of the instruction address by a first predetermined amount and storage of the modified address in a first register, characterized by:
   a) storing a lower order portion of said instruction address in a second register concurrently with said modification;
   b) following said interruption, retrieving said lower order portion from said second register and the lower order portion of the modified instruction address from said first register and performing a subtraction operation on said lower order portions;
   c) performing a test to determine whether a carry occurred as a result of said subtraction operation;
   d) modifying by a second predetermined amount the higher order portion of said modified instruction address if said test determines a particular result; and
   e) concatentating the higher order portion of said modified instruction address and the lower order portion of the instruction address held in said second register.

2. The method of claim 1, wherein said instruction address is represented by a number in binary digital form and said modification of said instruction address is the incrementation thereof, and further characterized in that:
   said lower order portions comprise the three lower order bits of the respective instruction addresses, and
   said higher order portion is modified in step (d) by subtracting therefrom the value hexadecimal 8.

3. The method of claim 1, wherein said instruction address is represented by a number in binary digital form and said modification of said instruction address is the decrementation thereof, and further characterized in that:
   said lower order portions comprise the three lower order bits of the respective instruction addresses, and
   said higher order portion is modified in step (d) by adding thereto the value hexadecimal 8.

* * * * *